US012589390B2

(12) United States Patent
Yin et al.

(10) Patent No.: US 12,589,390 B2
(45) Date of Patent: Mar. 31, 2026

(54) DETECTION CHIP AND MODIFICATION METHOD THEREFOR

(71) Applicant: BOE Technology Group Co., Ltd., Beijing (CN)

(72) Inventors: Yudan Yin, Beijing (CN); Jing Yu, Beijing (CN); Haonan Liu, Beijing (CN); Zhukai Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 1083 days.

(21) Appl. No.: 17/631,463

(22) PCT Filed: Mar. 4, 2021

(86) PCT No.: PCT/CN2021/079023

§ 371 (c)(1),
(2) Date: Jan. 29, 2022

(87) PCT Pub. No.: WO2021/185091

PCT Pub. Date: Sep. 23, 2021

(65) Prior Publication Data

US 2022/0274107 A1 Sep. 1, 2022

(30) Foreign Application Priority Data

Mar. 19, 2020 (CN) ........................ 202010197454.8

(51) Int. Cl.

*B01L 3/00* (2006.01)
*C03C 17/28* (2006.01)
*C03C 17/30* (2006.01)

(52) U.S. Cl.

CPC ........ *B01L 3/502707* (2013.01); *C03C 17/28* (2013.01); *C03C 17/30* (2013.01)

(58) Field of Classification Search

CPC ................................................ B01L 3/502707
See application file for complete search history.

(56) References Cited

U.S. PATENT DOCUMENTS

| | | | |
|---|---|---|---|
| 6,818,309 B1 | 11/2004 | Talpaert et al. | |
| 2008/0149566 A1* | 6/2008 | Messersmith | C23C 18/1844 564/443 |
| 2018/0105611 A1 | 4/2018 | Lee et al. | |

FOREIGN PATENT DOCUMENTS

| | | |
|---|---|---|
| CN | 1420853 A | 5/2003 |
| CN | 102764677 A | 11/2012 |

(Continued)

OTHER PUBLICATIONS

CN 105044359 A English Translation (Year: 2015).*

(Continued)

*Primary Examiner* — Alex A Rolland
(74) *Attorney, Agent, or Firm* — IPro, PLLC

(57) ABSTRACT

Disclosed are a detection chip and a modification method therefor. The method for modifying the detection chip comprises performing a surface film-forming treatment on a hydrophilic layer on a first substrate constituting the detection chip to form polydopamine film on a surface of the hydrophilic layer; and adopting a buffer solution containing sodium hyaluronate to perform a surface carboxylation treatment on the hydrophilic layer, on the surface of which the polydopamine film has been formed, in order to form a carboxyl-containing modification group on the surface of the hydrophilic layer.

6 Claims, 3 Drawing Sheets

(56) References Cited

FOREIGN PATENT DOCUMENTS

| | | | | | |
|---|---|---|---|---|---|
| CN | 102813963 | A | | 12/2012 | |
| CN | 104155453 | A | | 11/2014 | |
| CN | 104725075 | A | | 6/2015 | |
| CN | 105044359 | A | * | 11/2015 | ........... G01N 21/553 |
| CN | 105906219 | A | | 8/2016 | |
| CN | 105954237 | A | | 9/2016 | |
| CN | 106434302 | A | | 2/2017 | |
| CN | 106932366 | A | | 7/2017 | |
| CN | 107383409 | A | | 11/2017 | |
| CN | 107603874 | A | | 1/2018 | |
| CN | 107727633 | A | | 2/2018 | |
| CN | 108126766 | A | | 6/2018 | |
| CN | 111229348 | A | | 6/2020 | |

OTHER PUBLICATIONS

Machine Translation of Su, CN-105044359-A, no date.*
Glycosil product description, no date.*
Li-min, S. U. N. "Applications of time-of-flight secondary ion mass spectrometry in biomaterials and life science (part II)." Journal of Chinese Mass Spectrometry Society 35.5 (2014): 385.
CN202010197454.8 first office action.
CN202010197454.8 second office action.

* cited by examiner

DETECTION CHIP AND MODIFICATION METHOD THEREFOR

CROSS-REFERENCE TO RELATED APPLICATIONS

The present disclosure is a National Stage of International Application No. PCT/CN2021/079023, filed on Mar. 4, 2021, which claims the priority of the Chinese patent application No. 202010197454.8 filed to the China Patent Office on Mar. 19, 2020, and entitled "Detection Chip, Modification Method Therefor and Reaction System", of which the entire contents are incorporated herein by reference.

FIELD

The present disclosure relates to the technical field of biomedicine, in particular to a detection chip and a modification method therefor.

BACKGROUND

The noun of microfluidic chip is originally derived from a micro total analysis system (μTAS) proposed by Manz and Widmer at 1990s. The processor Manz successfully applies an MEMS technology to the field of analytical chemistry, soon high-speed capillary electrophoresis is achieved on a microchip, an achievement is published on magazines such as Science, since then, the academic circle rapidly pay attention to this field, and this field becomes one of the most cutting-edge science and technology field of the present world. Lab on a chip and the microfluidic chip are all different names proposed for this field by people, while with application of this subject expanding from initial analytical chemistry to a plurality of research and application fields and deep understanding of researchers on this subject, the microfluidic chip has become the general term of this field.

A biological chip is a chip technology, and its essence is that a series of known recognition molecules are orderly arrayed on a surface of a substrate in a lattice mode, so that the recognition molecules are combined or reacted with detected substances, then display and analysis are performed with a certain method, and finally, information such as a chemical molecular structure of the detected substances is obtained. The biological chip is applied widely, and can be applied to the fields of research and development of molecular biology, biomedicine and drugs. Compared with a traditional detection method, the biological chip has the characteristics of high throughput, high information amount, speediness, miniaturization, automation, wide use and the like.

SUMMARY

A modification method of a detection chip provided by an embodiment of the present disclosure, including:

forming a polydopamine film on a surface of the hydrophilic layer by adopting a dopamine-containing buffer solution to perform surface film-forming treatment on the hydrophilic layer on a first substrate constituting the detection chip, wherein the hydrophilic layer covers sample application platforms located on the first substrate; and forming a carboxyl-containing modification group on a surface of the hydrophilic layer by adopting a buffer solution containing sodium hyaluronate to perform a surface carboxylation treatment on the hydrophilic layer with the polydopamine film.

Optionally, in the above modification method provided by embodiments of the present disclosure, a mass concentration ratio of the dopamine to the sodium hyaluronate is 1:1-1:5.

Optionally, in the above modification method provided by embodiments of the present disclosure, the adopting the dopamine-containing buffer solution to perform the surface film-forming treatment on the hydrophilic layer on the first substrate constituting the detection chip, includes:

obtaining the buffer solution of the dopamine by weighing and taking 500 mg of dopamine to be dissolved in 250 mL of Tris-HCI, the Tris-HCI is of a pH value being 7-9 and a concentration being 10 mM;

putting the first substrate with the hydrophilic layer into the buffer solution of the dopamine to be subjected to still standing at a room temperature for a reaction for 12 h-24 h.

Optionally, in the above modification method provided by embodiments of the present disclosure, the adopting the buffer solution containing the sodium hyaluronate to perform the surface carboxylation treatment on the hydrophilic layer with the polydopamine film, includes:

obtaining the buffer solution of the sodium hyaluronate by weighing and taking 1.25 g of sodium hyaluronate to be dissolved in 250 mL of Tris-HCI, the Tris-HCI is of a pH value being 7-9 and a concentration being 10 mM; and;

putting the first substrate with the polydopamine film formed on the surface of the hydrophilic layer into the buffer solution of the sodium hyaluronate, to be subjected to still standing under a temperature condition of 20° C.-40° C. for a reaction for 12 h-24 h.

Optionally, in the above modification method provided by embodiments of the present disclosure, before the performing the surface film-forming treatment on the hydrophilic layer on the first substrate constituting the detection chip, the method further includes:

forming the hydroxyl-containing modification group on the surface of the hydrophilic layer by performing surface activation treatment on the hydrophilic layer on the first substrate.

Optionally, in the above modification method provided by embodiments of the present disclosure, the performing the surface activation treatment on the hydrophilic layer on the first substrate, includes:

putting the first substrate with the hydrophilic layer into a piranha solution, to be soaked under a temperature condition of 70° C.-90° C. for 12 h-24 h, wherein the piranha solution includes concentrated sulfuric acid and 30% hydrogen peroxide, and a volume ratio of the concentrated sulfuric acid to the 30% hydrogen peroxide is 1:3.

Optionally, in the above modification method provided by embodiments of the present disclosure, after the surface activation treatment, the surface film-forming treatment and the surface carboxylation treatment, following treatment is performed on the first substrate:

cleaning the first substrate for at least three times by adopting deionized water, and then blowing-drying the first substrate through nitrogen for standby application.

Optionally, in the above modification method provided by embodiments of the present disclosure, before the performing the surface activation treatment on the hydrophilic layer on the first substrate, the method further includes:

ultrasonic-cleaning the first substrate with the hydrophilic layer by sequentially adopting acetone, ethyl alcohol and deionized water as a solution, and blow-drying ultrasonic-cleaned first substrate for standby application.

Optionally, in the above modification method provided by embodiments of the present disclosure, before the ultrasonic-cleaning the first substrate with the hydrophilic layer, the method further includes:

forming the plurality of sample application platforms on the first substrate; and respectively forming the hydrophilic layer on the sample application platforms.

Optionally, in the above modification method provided by embodiments of the present disclosure, the respectively forming the hydrophilic layers on all the sample application platforms, specifically includes:

depositing a silicon oxide layer with a thickness being 300 nm on a layer where the sample application platforms are located, by adopting a plasma enhanced chemical vapor deposition, under a temperature condition of 390° C.; and obtaining the hydrophilic layer by etching the silicon oxide layer, and reserving a silicon oxide layer covering a region where all the sample application platforms are located.

On the other hand, an embodiment of the present disclosure further provides a detection chip, including:

a first substrate;

sample application platforms, located on the first substrate; and a hydrophilic layer, located on the first substrate and covering the sample application platforms, wherein a surface of the hydrophilic layer has a carboxyl-containing modification group, and the carboxyl-containing modification group is obtained by adopting the above modification method provided by the embodiment of the present disclosure.

Optionally, the above detection chip provided by embodiments of the present disclosure, further includes:

a diversion dam, located on the first substrate, wherein the diversion dam extends in a first path and located between the adjacent sample application platforms; and the hydrophilic layer covers the diversion dam, and a part, covering the diversion dam, of the hydrophilic layer and a part, covering the sample application platforms, of the hydrophilic layer are mutually independent.

Optionally, in the above detection chip provided by embodiments of the present disclosure, a height of the diversion dam in a direction perpendicular to the first substrate is greater than a height of the sample application platforms in the direction perpendicular to the first substrate.

Optionally, the above detection chip provided by embodiments of the present disclosure, further includes:

a hydrophobic layer, located on the first substrate, wherein the sample application platforms and the diversion dam are located on the hydrophobic layer.

Optionally, the above detection chip provided by embodiments of the present disclosure, further includes:

a second substrate, disposed opposite to the first substrate, and spaced from the first substrate so as to provide a detection space.

Optionally, in the above detection chip provided by embodiments of the present disclosure, at least one of the first substrate or the second substrate is a glass substrate.

Optionally, the above detection chip provided by embodiments of the present disclosure, further includes:

sealant, located between the first substrate and the second substrate, and surrounds the diversion dam and the plurality of sample application platforms.

DETAILED DESCRIPTION OF THE EMBODIMENTS

Figure 1:
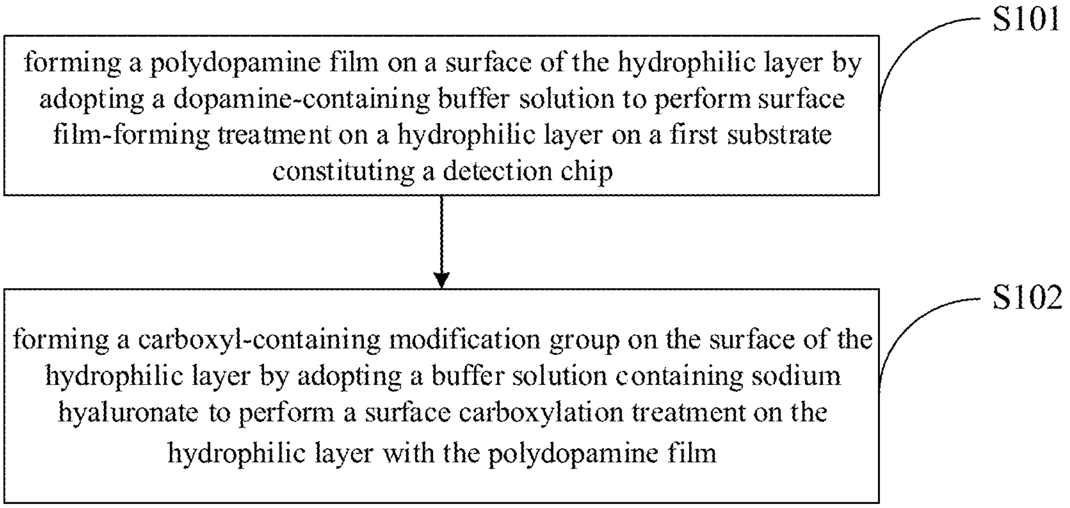
FIG. 1 is a flow diagram of a modification method of a detection chip provided by an embodiment of the present disclosure.

In order to make the objective, technical solutions and advantages of embodiments of the present disclosure more clear, the technical solutions of embodiments of the present disclosure will be described clearly and completely with reference to the drawings of embodiments of the present disclosure. Obviously, the described embodiments are part of the embodiments of the present disclosure, but not all embodiments. On the basis of the described embodiments of the present disclosure, all other embodiments obtained by those ordinarily skilled in the art without inventive efforts fall within the protection scope of the present disclosure.

It should be noted that unless otherwise specified, materials, reagents and the like used in the following embodiments can all be obtained from a business approach. The size and shapes of all graphs in the drawings do not reflect the true scale, and only intend to illustrate the content of the present disclosure. The same or similar reference numbers represent the same or similar elements or elements with the same or similar functions from beginning to end.

In the related technology, a compound film with a carboxyl or other containing groups capable of being coupled with protein is generally deposited or spin-coated on a glass substrate, so as to achieve manufacturing of a detection chip for subsequent protein coupling. However, the glass substrate prepared through a melting technology has many defects, resulting that the above compound film has poor adhesion on the glass substrate and is prone to falling, thereby influencing a protein coupling efficiency.

Aiming at the above problem existing in the related technology, embodiments of the present disclosure provide a detection chip, a modification method therefor, and a reaction system.

In some embodiments, the modification method of the detection chip, as shown in FIG. 1 and a reaction formula I, includes the following steps:

S101, a dopamine-containing buffer solution is adopted to perform surface film-forming treatment on a hydrophilic layer on a first substrate constituting the detection chip, so as to form a polydopamine film on a surface of the hydrophilic layer, wherein the hydrophilic layer covers sample application platforms located on the first substrate.

In some embodiments, the hydrophilic layer is generally manufactured by adopting a silicon oxide $SiO_x$ material, and the first substrate with silicon oxide is placed in the buffer solution of dopamine, so that the polydopamine film covering the silicon oxide can be formed.

S102, a buffer solution containing sodium hyaluronate is adopted to perform a surface carboxylation treatment on the hydrophilic layer with the polydopamine film formed on the surface, so as to form a carboxyl-containing modification group on the surface of the hydrophilic layer.

In some embodiments, the first substrate with the polydopamine film can be placed in the buffer solution of sodium hyaluronate, and the carboxyl-containing modification group is formed on the surface of the hydrophilic layer.

sodium hyaluronate with a molecular structure having a three-dimensional (3D) characteristic, and 3D high-density carboxyl distribution is formed on the surface of the hydrophilic layer. In other words, in combination with physical modification and chemical modification on the first substrate, carboxyl linked through chemical bonds is generated on the surface of the first substrate, a problem that the compound film containing the carboxyl on the detection chip in the related technology is prone to falling is solved, and the subsequent protein coupling efficiency is improved. It is applicable to a microfluidic system needed by in vitro

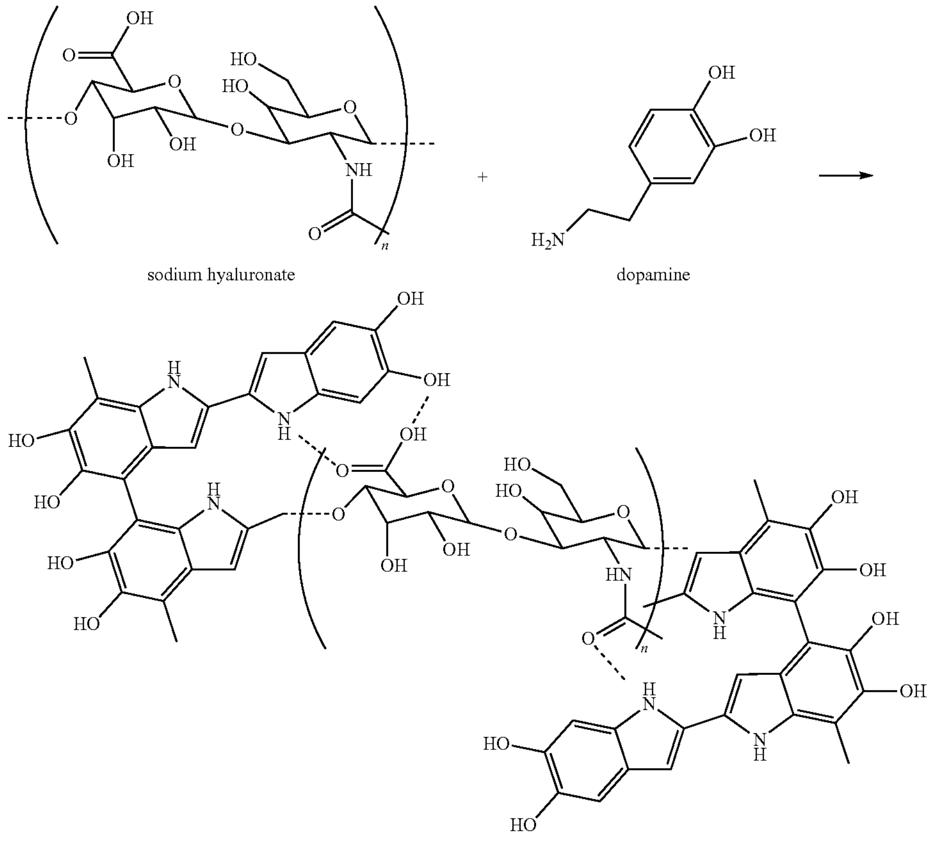

Formula I diagnosis, medicinal screening, cell culture, immunofluorescence detection and the like.

It should be noted that in a process of actually chemically modifying the surface of the hydrophilic layer, the dopamine and the sodium hyaluronate can be added step by step as mentioned above, or the dopamine and the sodium hyaluronate can be added synchronously, which is not limited here. But the above operation of adding the dopamine and the sodium hyaluronate step by step for realizing the reaction formula I, a reaction rate and a reaction extent are easy to control, therefore, during specific implementation, the above modification method provided by embodiments of the present disclosure is preferably selected.

In some embodiments, by adopting the hydrophilic layer to perform physical modification on the surface of the first substrate, surface defects of the detection chip in the related technology are effectively relieved; further, dopamine with excellent film-forming property is adopted to form the polydopamine film with the good adhesion on the surface of the hydrophilic layer; and finally, polydopamine reacts with In some embodiments, in order to obtain a good carboxylation effect formed on the surface of the hydrophilic layer, a mass concentration ratio of the dopamine to the sodium hyaluronate is 1:1-1:5. Exemplarily, the mass concentration ratio of the dopamine to the sodium hyaluronate may be 1:1, 1:1.25, 1:1.5, 1:1.8, 1:2, 1:2.25, 1:2.5, 1:3, 1:3.5, 1:4, 1:4.5, 1:5 and the like.

In some embodiments, the step S101 of adopting the dopamine-containing buffer solution to perform the surface film-forming treatment on the hydrophilic layer on the first substrate constituting the detection chip, may be implemented through the following mode:

500 mg of dopamine (DA) is weighed and taken to be dissolved in 250 mL of Tris-HCI with the pH value being 7-9 and with the concentration being 10 mM, so as to obtain the buffer solution of the dopamine; the above dissolving step should be as quick as possible and controlled within 1 min, so as to prevent the dopamine from aggregation discoloration in advance; and the first substrate with the hydrophilic layer is vertically put into a polydopamine film-forming fixture according to a fixture structure, the above prepared buffer solution of the dopamine is quickly poured into the polydopamine film-forming fixture, and then still standing is performed at the room temperature for the reaction for 12 h-24 h.

In some embodiments, a pH value of Tris-HCI may be 7, 7.5, 8, 8.5, 9 and the like; and a time for still standing for the reaction may be 12 h, 15 h, 16 h, 20 h, 22 h, 24 h and the like.

In some embodiments, after executing the above step S101, reaction liquid is further needed to be outwelled, deionized water is adopted to flush the first substrate for at least three times, each flushing is performed for 10 min, then blowing-drying is performed through nitrogen for standby application, so as to wash off impurities stained on the surface of the detection chip. Certainly, during specific implementation, the deionized water may also be adopted for performing ultrasonic cleaning treatment on the first substrate, which is not limited here.

In some embodiments, the step S102 of adopting the buffer solution containing the sodium hyaluronate to perform the surface carboxylation treatment on the hydrophilic layer with the polydopamine film formed on the surface, may be implemented through following mode:

1.25 g of sodium hyaluronate is weighed and taken to be dissolved in 250 mL of Tris-HCI with the pH value being 7-9 and with the concentration being 10 mM, and stirring overnight is performed till complete dissolving, so as to obtain the buffer solution of the sodium hyaluronate;

the first substrate with the polydopamine film formed on the surface of the hydrophilic layer is vertically put into a hyaluronic acid compound fixture, and the above prepared buffer solution of the sodium hyaluronate is slowly poured into the hyaluronic acid compound fixture to be subjected to still standing under a temperature condition of 20° C.-40° C. for a reaction for 12 h-24 h.

In some embodiments, a pH value of Tris-HCI may be 7, 7.5, 8, 8.5, 9 and the like; a temperature for still standing for the reaction may be 20° C., 25° C., 30° C., 35° C., 40° C. and the like; and the time for still standing for the reaction may be 12 h, 15 h, 16 h, 20 h, 22 h, 24 h and the like.

In some embodiments, after executing the above step S102, reaction liquid is further needed to be outwelled, deionized water is adopted to flush the first substrate for at least three times, each flushing is performed for 10 min, then blowing-drying is performed through nitrogen for standby application, so as to wash off impurities stained on the surface of the first substrate. Certainly, during specific implementation, the deionized water may also be adopted for performing ultrasonic cleaning treatment on the first substrate, which is not limited here.

In some embodiments, before executing the step S101 of performing the surface film-forming treatment on the hydrophilic layer on the first substrate constituting the detection chip, the following step may further be executed:

surface activation treatment is performed on the hydrophilic layer on the first substrate, so as to form the hydroxyl-containing modification group on the surface of the hydrophilic layer, as shown in reaction formula II.

Formula II

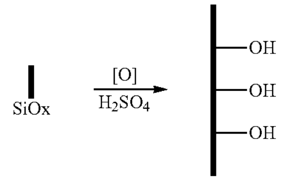

In some embodiments, the hydrophilic layer is generally manufactured by adopting the silicon oxide $SiO_x$ material, and the surface activation treatment is performed on the silicon oxide material, so that silicon oxide on the surface of the hydrophilic layer can be converted to a silicon hydroxyl, that is, the hydroxyl-containing modification group is formed on the surface of the hydrophilic layer. By converting the silicon oxide into the silicon hydroxyl, the surface adhesion of the first substrate can be increased, and a falling probability of the subsequently-formed polydopamine film is further reduced.

In some embodiments, the above step of performing the surface activation treatment on the hydrophilic layer on the first substrate, may be implemented through the following mode:

the first substrate with the hydrophilic layer is vertically put into an activation fixture according to a fixture structure, a piranha solution (concentrated sulfuric acid: 30% hydrogen peroxide=1:3) is prepared on site without cooling, and is slowly poured into the activation fixture, and water bath stirring is performed under a condition of 70° C.-90° C. for 12 h-24 h.

In some embodiments, a temperature for water bath stirring is 70° C., 72° C., 75° C., 80° C., 83° C., 85° C., 88° C., 90° C. and the like, and a time for water bath stirring is 12 h, 15 h, 18 h, 20 h, 21 h, 24 h and the like.

In some embodiments, after executing the above activation step, the piranha solution is further needed to be outwelled and properly treated, deionized water is adopted to flush the first substrate for at least two times, then the deionized water is adopted for performing ultrasonic cleaning on the first substrate for 10 min, so as to remove impurities stained on the surface of the first substrate in an activation process, and finally, blowing-drying is performed through nitrogen for standby application.

In some embodiments, before executing the step of performing the surface activation treatment on the hydrophilic layer on the first substrate, the following step may further be executed:

acetone, ethyl alcohol and deionized water are sequentially adopted as a solution to perform ultrasonic cleaning on the first substrate with the hydrophilic layer, and nitrogen is adopted to blow-dry the final first substrate subjected to ultrasonic cleaning for standby application.

In some embodiments, after a film layer such as the hydrophilic layer is manufactured on a master mask glass substrate, the master mask glass substrate with a thickness being 0.5 mm is cut into a glass slide with a standard of 1 in×3 in, then the glass slide serves as the first substrate to be loaded into a cleaning fixture for precleaning, and a cleaning technology flow sequentially includes: acetone is adopted for ultrasonic cleaning for 10 min, ethyl alcohol is adopted for ultrasonic cleaning for 10 min, deionized water is adopted for ultrasonic cleaning for 10 min, and deionized water is adopted again for ultrasonic cleaning for 10 min. In this way, other impurities such as greasy on the surface of the first substrate may be washed off. After cleaning is finished, the first substrate is blown-dried through nitrogen for standby application.

In some embodiments, before adopting the acetone as the solution to perform ultrasonic cleaning on the first substrate with the hydrophilic layer, the following steps may further be executed:

the plurality of sample application platforms are formed on the first substrate; and the hydrophilic layers are respectively formed on all the sample application platforms.

In the related technology, the first substrate of the detection chip has a certain degree of hydrophobicity, while a solvent contained by a to-be-detected solution in the biological field is generally water, therefore, contact between the to-be-detected solution and the first substrate is not good, which is disadvantageous to combining of a marker in the to-be-detected solution with the detection chip. Silicon oxide has hydrophilcity, so that the detection chip provided by the present disclosure can make close contact with the to-be-detected solution better, thereby improving the detection effect.

In some embodiments, the above step of respectively forming the hydrophilic layers on all the sample application platforms, may be implemented through the following mode:

a plasma enhanced chemical vapor deposition (PECVD) method is adopted to deposit, under a temperature condition of 390° C., a silicon oxide layer with a thickness being 300 nm on a layer where all the sample application platforms are located; and the silicon oxide layer is etched, and a silicon oxide layer covering a region where all the sample application platforms are located is reserved to obtain the hydrophilic layer.

The hydrophilic layer of a silicon oxide material formed by adopting the above method has the advantages of being good in film thickness uniformity, less in film layer pinhole, and not prone to cracking, so that the contact effect between the to-be-detected solution and the detection chip is better.

It's should be noticed that parameters such as time and temperature appearing in the above modification process are only illustrated, and do not serve as a limiting condition.

Figure 2A:
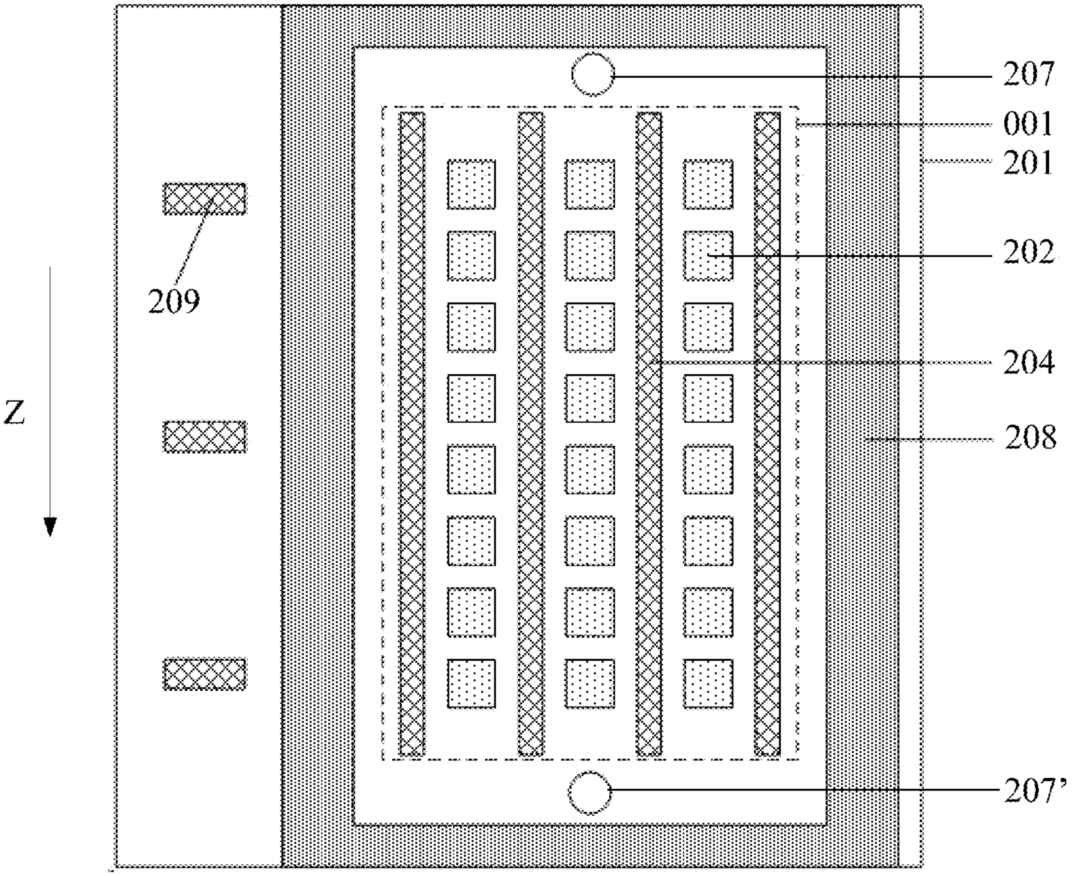
FIG. 2A is schematic plane diagram of a detection chip provided by an embodiment of the present disclosure.
Figure 2B:
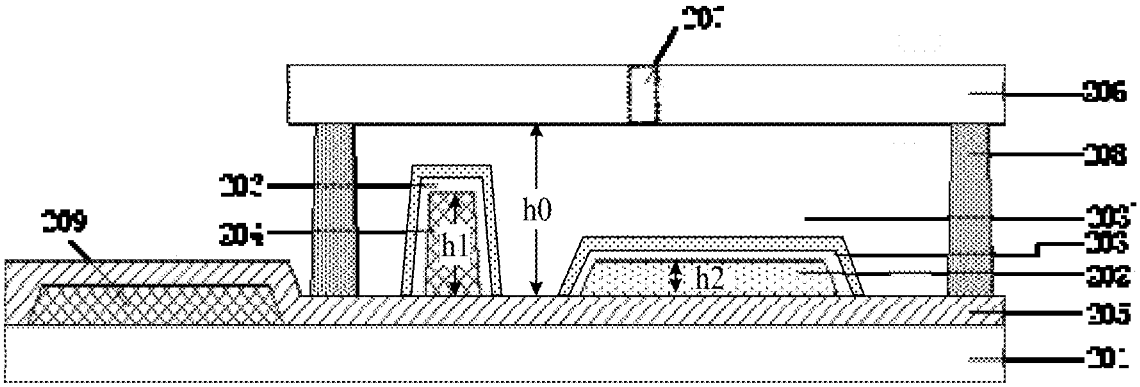
FIG. 2B is a schematic cross-section diagram of a detection chip provided by an embodiment of the present disclosure.

Based on the same inventive concept, an embodiment of the present disclosure further provides a detection chip, as shown in FIG. 2A and FIG. 2B, including: a first substrate 201, sample application platforms 202 located on the first substrate 201, and a hydrophilic layer 203 covering the sample application platforms 202, where a surface of the hydrophilic layer 203 has a carboxyl-containing modification group 203', and the carboxyl-containing modification group is obtained by adopting the above modification method provided by embodiments of the present disclosure.

FIG. 2A is schematic plane diagram of the detection chip provided by some embodiments of the present disclosure, and FIG. 2B is a schematic cross-section diagram of the detection chip as shown in FIG. 2A.

Figure 3:
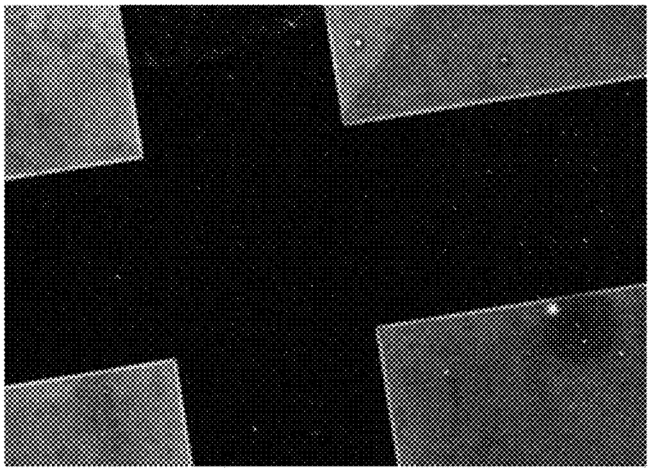
FIG. 3 is a fluorescence image for antibody labeling by adopting a detection chip provided by an embodiment of the present disclosure.

In some embodiments, the modification group 203' on the surface of the hydrophilic layer 203 is obtained by adopting the above modification method provided by embodiments of the present disclosure, the modification group 203' has a carboxyl thereon, and the carboxyl can be combined with a target antigen or antibody. In some embodiments, in FIG. 3, a region with a lighter color (namely the lower half part in the figure) shows a testing result of a link efficiency between a fluorescently-labeled antibody and the carboxyl in the modification group 203'. The result proves that a high 3D carboxyl grafting density on the surface of the detection chip provided by the present disclosure enables the detection chip show the ultrahigh protein coupling efficiency and ultralow nonspecific adsorption when being combined with proteins such as the antibody.

In some embodiments, the first substrate 201 plays a role in supporting, protecting and the like, and may be a plastic substrate, a glass substrate or a silicon substrate, or other applicable substrates, which is not limited by the embodiment of the present disclosure. For example, when the glass substrate is adopted, the cost is low; and when the silicon substrate is adopted, the performance is good. For example, the first substrate 201 is a transparent substrate (for example, the glass substrate), so that a light ray can penetrate through the transparent substrate nondestructively or with low loss, thereby improving accuracy of subsequent optical detection, and reducing the requirements for optical detection equipment provided separately.

In some embodiments, the plurality of sample application platforms 202 are located on the first substrate 201, and the sample application platforms 202 are configured to, for example, provide an attachment site for the target antigen or antibody. For example, in some embodiments, the sample application platforms 202 are in a shape of boss, so that the target antigen or antibody attached thereon are combined or react with a marker in a to-be-detected solution flowing through the sample application platforms 202. Certainly, embodiments of the present disclosure is not limited to this, the sample application platforms 202 may also be in a shape of groove or plane, as long as it can be ensured that the target antigen or antibody attached on the sample application platforms 202 can make contact with the to-be-detected solution flowing through the sample application platforms 202 and can be combined with the marker therein. It should be noted that in embodiments of the present disclosure, the quantity of the sample application platforms 202 is not limited, and may be any number, which is for example, determined according to a category or concentration of the marker needing to be detected.

In some embodiments, as shown in FIG. 2A and FIG. 2B, may further includes: a diversion dam 204 located on the first substrate 201, wherein the diversion dam 204 extends in a first path and located between the adjacent sample application platforms 202; and the hydrophilic layer 203 covers the diversion dam 204, and a part, covering the diversion dam 204, of the hydrophilic layer 203 and a part, covering the sample application platforms 202, of the hydrophilic layer 203 are mutually independent.

In some embodiments, the diversion dam 204 is located on the first substrate 201, and the diversion dam 204 extends in the first path and located between the adjacent sample application platforms 202. The diversion dam 204 influences a flow filed of an internal space of the detection chip, so as to improve the flow rate uniformity of a position where the different sample application platforms 202 are located, improve the parallelism of the flow field along the first path, and improve stability of the flow field, and thus the to-be-detected solution can stably and uniformly flow the region where the sample application platforms 202 are located. Therefore, the marker in the to-be-detected solution can be sufficiently combined or react with the target antigen or antibody attached on the sample application platforms 202, so as to contribute to improve the accuracy degree and reliability degree of an immunodetection result. Furthermore, the detection chip further has the characteristics of small size, high throughput and the like.

In some embodiments, as shown in FIG. 2A, the plurality of sample application platforms 202 are arrayed into a plurality of columns, and the first path extends in a column direction Z. The diversion dams 204 are disposed on two sides of each sample application platform 202, and the plurality of diversion dams 204 are parallel to each other. When the to-be-detected solution flows through the plurality of sample application platforms 202 in the column direction Z, under the action of the diversion dams 204, the parallelism of the flow field formed by flowing of the to-be-detected solution in the column direction Z is improved, so that the to-be-detected solution can stably and uniformly flow in the column direction Z.

It should be noted that in embodiments of the present disclosure, the first path is not limited to extend in the column direction Z, and may extend in any other directions. Furthermore, the first path may extend in a straight line or a curve, which can be determined according to a flowing path and flowing mode of the to-be-detected solution, which is not limited by the embodiment of the present disclosure. For example, when the first path extends in the straight line, the diversion dams 204 also extend in the straight line; and when the first path extends in the curve, the diversion dams 204 also extend in the curve. Accordingly, the plurality of sample application platforms 202 may be arrayed into a plurality of columns in the straight line, or arrayed into a plurality of sets in the curve, and the diversion dams 204 located between the adjacent sample application platforms 202 extend in an arraying direction of the sample application platforms 202.

It should be noted that in the embodiment of the present disclosure, the diversion dams 204 may be disposed on the two sides of each column of sample application platforms 202, or the diversion dams 204 may be disposed on the two sides of certain columns of sample application platforms 202, which can be determined according to the flow field parallelism needing to be reached, and which is not limited by embodiments of the present disclosure.

For example, when the diversion dams 204 are disposed on the two sides of each column of sample application platforms 202 (for example, when the sample application platforms 202 and the sample application platforms 204 are disposed into a case as shown in FIG. 2A), the flow field has the good parallelism. If the target antigen or antibody attached on certain sample application platform 202 falls off accidentally, the fallen target antigen or antibody flows in the column direction Z, that is, flows in a region where the column of sample application platforms 202 are located, other columns of sample application platforms 202 are not influenced, thereby avoiding crosstalk between different detection sites (namely the sample application platforms 202) and avoiding cross pollution.

For example, the quantity of the diversion dams 204 is not limited, and there may be one or more diversion dams 204. For example, in some examples, if the plurality of sample application platforms 202 are only arrayed into the two columns, only one diversion dam 204 may be disposed and located between the two columns of sample application platforms 202, thereby enabling the flow field have the good parallelism while reducing the quantity of the diversion dams 204.

For example, a section shape of the diversion dams 204 in a direction perpendicular to the first path (such as the column direction Z) may be a rectangle, a square, a trapezoid, a semicircle or other suitable shapes, for example, may be regular shapes or irregular shapes, which is not limited by embodiments of the present disclosure. For example, the different section shapes will generate the different degrees of influences on the flow field, and therefore, the section shape of the diversion dam 204 may be determined according to the characteristics of the flow field.

For example, both the diversion dam 204 and the sample application platforms 202 may be prepared by adopting photoresist, and the photoresist may be, for example, photoresist capable of being subjected to thick film etching. For example, in some examples, the diversion dam 204 and the sample application platforms 202 may be formed in the same composition technology, so as to simplify a production technology.

In some embodiments, the above detection chip as shown in FIG. 2B, may further includes: a hydrophobic layer 205 located on the first substrate 201, wherein both the sample application platforms 202 and the diversion dam 204 are located on the hydrophobic layer 205. By disposing the hydrophobic layer 205, the to-be-detected solution may flow in the detection chip more easily, the marker of the to-be-detected solution is not attached to the first substrate 201 easily, so as to prevent the marker in the to-be-detected solution to be wasted.

For example, a material of the hydrophobic layer 205 is resin or silicon nitride. Certainly, the hydrophobic layer 205 may also be prepared by adopting other suitable inorganic or organic materials, and it is only needed to ensure that a side, away from the first substrate 201, of the hydrophobic layer 205 has the hydrophobicity. For example, the hydrophobic layer 205 may be directly prepared by adopting a hydrophobic material. For another example, the hydrophobic layer 205 may be prepared by adopting a material without the hydrophobicity. In this case, hydrophobic treatment should be performed on a surface, away from the first substrate 201, of the hydrophobic layer 205, so that the surface, away from the first substrate 201, of the hydrophobic layer 205 has the hydrophobicity.

In some embodiments, the above detection chip as shown in FIG. 2B, may further includes: a second substrate 206 disposed opposite to the first substrate 201, and spaced from the first substrate 201 so as to provide a detection space (namely, a liquid flow space). A material of the second substrate 206 and a material of the first substrate 201 may be the same or different, which is not limited by the embodiment of the present disclosure. For example, the second substrate 206 is a transparent substrate (for example, a glass substrate), so that a light ray can penetrate through the transparent substrate nondestructively or with low loss, thereby improving accuracy of subsequent optical detection, and reducing the requirements for the optical detection equipment provided separately.

In some embodiments, the above detection chip as shown in FIG. 2A, may further include a sample inlet 207, a sample outlet 207' and a detection region 001. For example, the plurality of sample application platforms 202 are located in the detection region 001, the plurality of sample application platforms 202 are arrayed into the plurality of columns, and the sample inlet 207 and the sample outlet 207' are distributed on two sides of the detection region 001 (for example, an upper side and a lower side in the figure) in the column direction Z. For example, the to-be-detected solution may be injected into the sample inlet 207 through a micro-injection pump or a pipette, flows through the plurality of sample application platforms 202 in the column direction Z, and then flows out from the sample outlet 207'. For example, the sample inlet 207 and the sample outlet 207' are distributed on the two sides of the detection region 001 in the column direction Z in an axial symmetry or central symmetry mode, so as to further improve the parallelism and stability of the flow field. Certainly, embodiments of the present disclosure is not limited to this, the sample inlet 207 and the sample outlet 207' may also be distributed asymmetrically, which can be determined according to the features and actual demands of the flow field.

In some embodiments, the sample inlet 207 and the sample outlet 207' are disposed on the second substrate 206. For example, as shown in FIG. 2B, the sample inlet 207 may be a through hole penetrating through the second substrate 206, and a shape of the through hole on a section parallel to the second substrate 206 may be any suitable shapes such as a circle, a rectangle and a square. Similarly, the sample outlet 207' may also be a through hole penetrating through the second substrate 206, and a shape of the sample outlet 207' on a section parallel to the second substrate 206 may be the same or different from the shape of the sample inlet 207. It should be noted that FIG. 2B only schematically shows a disposing mode of the sample inlet 207 on the second substrate 206, but a relative position of the sample inlet 207 and the sample application platforms 202 is not limited by the case shown in FIG. 2B.

In some embodiments, the above detection chip as shown in FIG. 2B, may further includes: sealant 208 located between the first substrate 201 and the second substrate 206, wherein the sealant 208, serving as a supporting part, surrounds the diversion dam 204 and the plurality of sample application platforms 202. Specifically, the first substrate 201, the second substrate 206 and the sealant 208 commonly define the flow space of the to-be-detected solution. For example, in some examples, a spacer may be mixed in the sealant 208, thus spacing between the first substrate 201 and the second substrate 206 can be controlled through the spacer, and a compressive strength of the detection chip is enhanced.

In some embodiments, in the above detection chip as shown in FIG. 2B, a height h1 of the diversion dam 204 in a direction perpendicular to the first substrate 201 is greater than a height of the sample application platforms 202 in the direction perpendicular to the first substrate 201, so as to better play a role in adjusting the parallelism of the flow field. Specifically, the height h1 of the diversion dam 204 is 30%-60%, for example, 40% or 50% of a distance h0 between the first substrate 201 and the second substrate 206. For example, in some examples, the distance h0 between the first substrate 201 and the second substrate 206 is 100 microns, the height h1 of the diversion dam 204 is 50 microns, a height h2 of the sample application platforms 202 is 3 microns, a height difference between h1 and h2 is large, and the parallelism of the flow field may be better adjusted. For example, in some examples, when the section shape of the diversion dam 204 in the direction perpendicular to the first path (for example, the column direction Z) is the semicircle, a radius of the semicircle may be greater than or equal to a half of the distance h0 between the first substrate 201 and the second substrate 206.

It should be noted that in embodiments of the present disclosure, the height h1 may refer to a height of the diversion dam 204, or a sum of the height of the diversion dam 204 and a height of the hydrophilic layer 203. Similarly, the height h2 may refer to a height of the sample application platforms 202, or a sum of the height of the sample application platforms 202 and the height of the hydrophilic layer 203.

In some embodiments, when using the above detection chip, before box aligning the first substrate 201 and the second substrate 206, the target antigen or antibody is attached to the sample application platforms 202. For example, liquid containing the target antigen or antibody is dripped on the sample application platforms 202, due to existence of the modification group 203', the target antigen or antibody is combined with the modification group 203', so as to be attached to the sample application platforms 202. Then, the first substrate 201 and the second substrate 206 are oppositely closed by adopting the sealant. Then, the to-be-detected solution is injected from the sample inlet 207, so that the to-be-detected solution flows through the detection region 001, and flows out from the sample outlet 207'. The marker in the to-be-detected solution is combined or reacts with the target antigen or antibody dripped on the sample application platforms 202 when flowing through the sample application platforms 202. Then, a bovine serum albumin (BSA) solution, for example, may be injected into the detection chip, so as to clean the internal space of the detection chip, so as to reduce adsorption of the part, except for the sample application platforms 202, in the internal space of the detection chip for the to-be-detected solution, thereby further improve the accuracy of subsequent detection. Finally, optical detection equipment is adopted to perform optical detection on the detection chip, so as to obtain an immunodetection result.

In some embodiments, the above detection chip as shown in FIG. 2A and FIG. 2B, may further include: a positioning part 209, wherein the positioning part 209 is configured to be matched with the optical detection equipment provided separately so as to achieve positioning of the detection chip, and thus the optical detection equipment conveniently performs optical detection on the detection chip. For example, the positioning part 209 is disposed on the first substrate 201 and is covered with the hydrophobic layer 205. The positioning part 209 may be prepared by adopting a metal material, for example, molybdenum (Mo), or may be prepared by adopting a lightproof insulating material, which is not limited by embodiments of the present disclosure.

In some embodiments, during positioning, an optical positioning device of the optical detection equipment emits light for positioning. If the detection chip is located at a preset position, because the positioning part 209 is lightproof, a light density detected by a sensor disposed on a corresponding position is very small or is zero, thus it can be judged that the detection chip is located on at the preset position, so as to realize positioning. After positioning is completed, the optical detection equipment may be adopted to perform optical detection and signal reading on a specific site. For example, the specific site is certain or some sample application platforms 202, with the target antigen or antibody attached thereon.

In some embodiments, the positioning part 209 is located outside the detection region 001, for example, further located outside the liquid flow space formed by the first substrate 201, the second substrate 206 and the sealant 208, so as to avoid influencing the optical detection. For example, in some example, as shown in FIG. 2A, the plurality of positioning parts 209 are disposed on one side of the detection chip and are close to an edge of the detection chip. By disposing the plurality of positioning parts 209, positioning precision can be improved. Certainly, embodiments of the present disclosure is not limited to this, disposing of the positioning part 209 be determined according to the actual demands, for example, the positioning part may be disposed on any side, any two sides, or a periphery of the detection chip, or other suitable positions, which can be determined by the positioning mode of the optical detection equipment matched with it. The quantity of the positioning parts 209 is also not limited and may be any number, which can be determined according to the actual demands.

Based on the same inventive concept, an embodiment of the present disclosure further provides a reaction system, including: the above detection chip provided by the embodiment of the present disclosure. Principles of the reaction system for solving the problems are similar to that of the above detection chip, therefore, implementation of the reaction system provided by embodiments of the present invention may refer to that of the above detection chip provided by embodiments of the present invention, and repetitions are omitted.

It can be known in combination with the above description that in the above detection chip and the modification method therefor provided by embodiments of the present disclosure, by adopting the hydrophilic layer to perform physical modification on the surface of the first substrate, surface defects of the detection chip in the related technology are effectively relieved; further, dopamine with the excellent film-forming property is adopted to form the polydopamine film with the good adhesion on the surface of the hydrophilic layer; and finally, polydopamine reacts with sodium hyaluronate with the molecular structure having the three-dimensional (3D) characteristic, and 3D high-density carboxyl distribution is formed on the surface of the first substrate. In other words, in combination with the physical modification and chemical modification on the first substrate, the carboxyl linked through chemical bonds is generated on the surface of the first substrate, a problem that a compound film containing the carboxyl on the detection chip in the related technology is prone to falling is solved, and the subsequent protein coupling efficiency is improved. It is applicable to a microfluidic system needed by in vitro diagnosis, medicinal screening, cell culture, immunofluorescence detection and the like. In addition, the above modification method provided by the present disclosure is performed based on the glass substrate, which facilitates mass production, and also effectively reduces the cost. Besides, it can be seen from the above description that the above modification method provided by the present disclosure is relative simple in operation flow, thereby facilitating improvement of the efficiency.

It should be noted that the present disclosure illustrates the technological method of the present disclosure through the above embodiments, but the present disclosure is not limited to the above technological steps, that is, it does not mean that the present disclosure must depend on the above technological steps to be implemented. Those skilled in the art should understand that any improvement on the present disclosure, equivalent substitution of selected raw materials of the present disclosure, addition of auxiliary components, selection of a specific mode, and the like all fall within the protection scope and disclosure scope of the present disclosure.

What is claimed is:

1. A modification method of a detection chip, comprising:

forming a polydopamine film on a surface of a hydrophilic layer by adopting a dopamine-containing buffer solution to perform surface film-forming treatment on the hydrophilic layer on a first substrate constituting the detection chip, wherein the hydrophilic layer covers sample application platforms located on the first substrate; and forming a carboxyl-containing modification group on a surface of the hydrophilic layer by adopting a buffer solution containing sodium hyaluronate to perform a surface carboxylation treatment on the hydrophilic layer with the polydopamine film;

wherein before the performing the surface film-forming treatment on the hydrophilic layer on the first substrate constituting the detection chip, the modification method further comprises:

forming the hydroxyl-containing modification group on the surface of the hydrophilic layer by putting the first substrate with the hydrophilic layer into a piranha solution, to be soaked under a temperature condition of 70° C.-90° C. for 12 h-24 h, wherein the piranha solution comprises concentrated sulfuric acid and 30% hydrogen peroxide, and a volume ratio of the concentrated sulfuric acid to the 30% hydrogen peroxide is 1:3;

wherein before the forming hydroxyl-containing modification group on the hydrophilic layer on the first substrate, the modification method further comprises:

ultrasonic-cleaning the first substrate with the hydrophilic layer by sequentially adopting acetone, ethyl alcohol and deionized water as a solution, and blow-drying ultrasonic-cleaned first substrate for standby application;

wherein before the ultrasonic-cleaning the first substrate with the hydrophilic layer, the modification method further comprises:

forming the plurality of sample application platforms on the first substrate; and respectively forming the hydrophilic layer on the sample application platforms, comprising:

depositing a silicon oxide layer on a layer where the sample application platforms are located; and obtaining the hydrophilic layer by etching the silicon oxide layer, and reserving a silicon oxide layer covering a region where all the sample application platforms are located to.

2. The modification method according to claim 1, wherein a mass concentration ratio of the dopamine to the sodium hyaluronate is 1:1-1:5.

3. The modification method according to claim 2, wherein the adopting the dopamine-containing buffer solution to perform the surface film-forming treatment on the hydrophilic layer on the first substrate constituting the detection chip, comprises:

obtaining the buffer solution of the dopamine by weighing and taking 500 mg of dopamine to be dissolved in 250 ml of Tris-HCl, the Tris-HCl is of a pH value being 7-9 and a concentration being 10 mM;

putting the first substrate with the hydrophilic layer into the buffer solution of the dopamine to be subjected to still standing at a room temperature for a reaction for 12 h-24 h.

4. The modification method according to claim 2, wherein the adopting the buffer solution containing the sodium hyaluronate to perform the surface carboxylation treatment on the hydrophilic layer with the polydopamine film, comprises:

obtaining the buffer solution of the sodium hyaluronate by weighing and taking 1.25 g of sodium hyaluronate to be dissolved in 250 mL of Tris-HCl, the Tris-HCl is of a pH value being 7-9 and a concentration being 10 mM; and putting the first substrate with the polydopamine film formed on the surface of the hydrophilic layer into the buffer solution of the sodium hyaluronate, to be subjected to still standing under a temperature condition of 20° C.-40° C. for a reaction for 12 h-24 h.

5. The modification method according to claim 1, wherein after the forming the hydroxyl-containing modification group, the surface film-forming treatment and the surface carboxylation treatment, following treatment is performed on the first substrate:

cleaning the first substrate for at least three times by adopting deionized water, and then blowing-drying the first substrate through nitrogen for standby application.

6. The modification method according to claim 1, wherein the depositing the silicon oxide layer on the layer where the sample application platforms are located, comprises:

depositing the silicon oxide layer with a thickness being 300 nm on the layer where the sample application platforms are located, by adopting a plasma enhanced chemical vapor deposition, under a temperature condition of 390° C.

* * * * *